US011644858B2

(12) United States Patent
Hatada et al.

(10) Patent No.: US 11,644,858 B2
(45) Date of Patent: May 9, 2023

(54) LEVER OPERATION DEVICE AND METHOD FOR MANUFACTURING THE SAME

(71) Applicant: KABUSHIKI KAISHA TOKAI RIKA DENKI SEISAKUSHO, Aichi (JP)

(72) Inventors: Yosuke Hatada, Aichi (JP); Yuki Sato, Aichi (JP); Takamitsu Ito, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/708,874

(22) Filed: Mar. 30, 2022

(65) Prior Publication Data

US 2022/0317721 A1    Oct. 6, 2022

(30) Foreign Application Priority Data

Apr. 2, 2021    (JP) .............................. JP2021-063506

(51) Int. Cl.
*G05G 1/04*    (2006.01)
*G05G 5/06*    (2006.01)
(Continued)

(52) U.S. Cl.
CPC ............... *G05G 1/04* (2013.01); *G01B 7/003* (2013.01); *G05G 5/065* (2013.01); *B60Q 1/1469* (2013.01); *B60Q 1/343* (2013.01)

(58) Field of Classification Search
CPC . G05G 1/04; G05G 5/065; G05G 5/06; F16H 2061/243; F16H 2061/247;
(Continued)

(56) References Cited

U.S. PATENT DOCUMENTS 5,309,784 A * 5/1994 Kobayashi .............. F16H 59/10
74/900
5,859,396 A * 1/1999 Yokoyama ........... B60Q 1/1469
200/61.54
(Continued)

FOREIGN PATENT DOCUMENTS

EP        2636926 A1 *  9/2013 ........... F16H 59/044
JP     2008-218067 A     9/2008

*Primary Examiner* — Daniel D Yabut
(74) *Attorney, Agent, or Firm* — Thomas W. Cole; Calderon Safran & Cole P.C.

(57) ABSTRACT

A lever operation device includes a lever main body on which a first rotation operation about a first shaft is performed, a bracket portion that includes an insertion opening for insertion of the lever main body and a through-hole in communication with the insertion opening, a housing which rotatably holds the bracket portion and on which a detent wall including a detent surface is arranged, and a detent portion that is inserted into the through-hole and includes a detent tip end portion in contact with the detent surface, a detent base end portion in contact with the lever main body inserted into the insertion opening of the bracket portion, and an elastic portion applying an elastic force, which is generated by being sandwiched and compressed by the detent surface and the lever main body, to the detent surface and the lever main body.

12 Claims, 7 Drawing Sheets

(51) Int. Cl.
  *G01B 7/00* (2006.01)
  *B60Q 1/34* (2006.01)
  *B60Q 1/14* (2006.01)

(58) Field of Classification Search
  CPC .......... F16H 61/24; H01H 3/50; H01H 3/503; H01H 2003/506; B60Q 1/1469; B60Q 1/1461; B60Q 1/1453
  See application file for complete search history.

(56) References Cited

U.S. PATENT DOCUMENTS

| | | |
|---|---|---|
| 7,880,572 B2 | 2/2011 | Ichimura |
| 2008/0211609 A1 | 9/2008 | Ichimura |
| 2016/0230878 A1* | 8/2016 | Nakanishi ............. F16H 59/105 |
| 2022/0314872 A1* | 10/2022 | Hatada ................. B60Q 1/1469 |

* cited by examiner

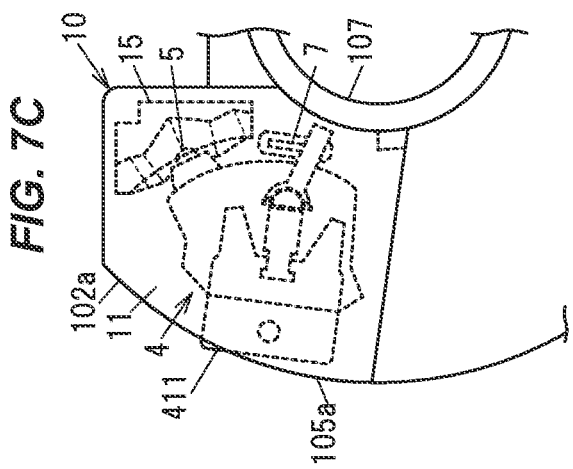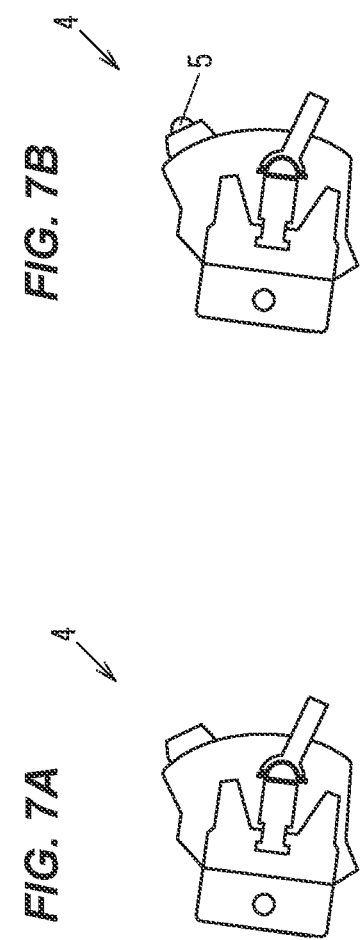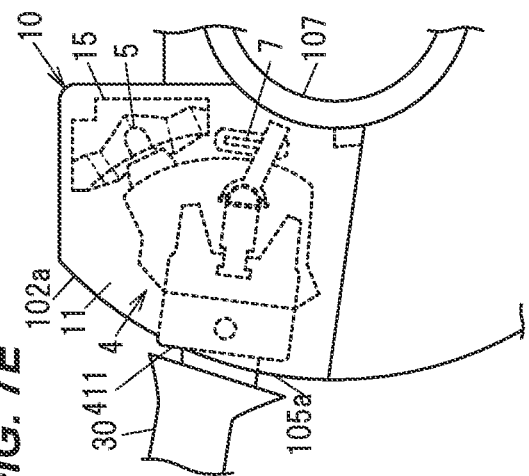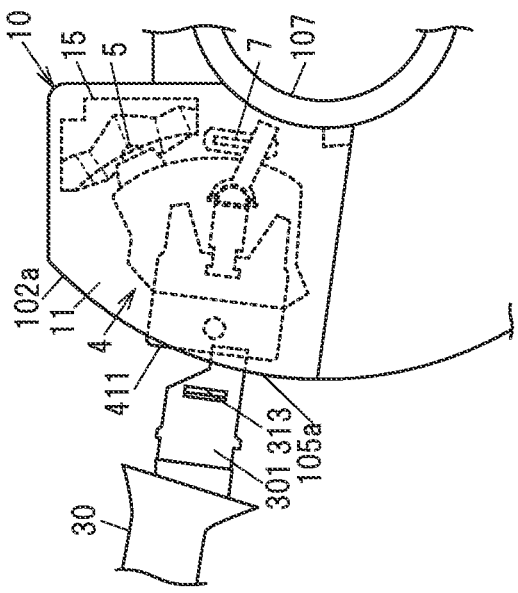

LEVER OPERATION DEVICE AND METHOD FOR MANUFACTURING THE SAME

CROSS-REFERENCE TO RELATED APPLICATIONS

The present patent application claims the priority of Japanese patent application No. 2021/063506 filed on Apr. 2, 2021, and the entire contents of Japanese patent application No. 2021/063506 are hereby incorporated by reference.

TECHNICAL FIELD

The present invention relates to a lever operation device and a method for manufacturing the lever operation device.

BACKGROUND ART

A lever switch is known which includes a lever pivotally operable in predetermined directions, rotating bodies that rotate according to an operation performed on the lever, magnets attached to the centers of the rotating bodies, and magnetic detection elements to detect magnetic fields of the magnets (see, e.g., Patent Literature 1).

The lever is arranged between an upper case and a lower case so as to be pivotally operable back and forth and up and down from an intermediate position. A cover is further attached to the upper case so as to cover a lower surface. The lever has an outer lever exposed to the outside of the upper case and an inner lever located inside the upper case. A detent means which has a pin and a spring applying an elastic force to the pin is arranged in an opening at the tip of the inner lever.

CITATION LIST

Patent Literature

Patent Literature 1: JP 2008/218067 A

SUMMARY OF INVENTION

When assembling the lever switch, the upper case and the lower case must be assembled while holding down the pin of the of the detent means so that the pin does not pop out by an elastic force of the spring, hence, it is not easy to assemble.

It is an object of the invention to provide a lever operation device with improved ease of assembly, and a method for manufacturing the lever operation device.

According to an aspect of the invention, a lever operation device comprises:
- a lever main body on which a first rotation operation about a first shaft is performed;
- a bracket portion that comprises an insertion opening for insertion of the lever main body and a through-hole in communication with the insertion opening;
- a housing which rotatably holds the bracket portion and on which a detent wall comprising a detent surface is arranged; and
- a detent portion that is inserted into the through-hole and comprises a detent tip end portion in contact with the detent surface, a detent base end portion in contact with the lever main body inserted into the insertion opening of the bracket portion, and an elastic portion applying an elastic force, which is generated by being sandwiched and compressed by the detent surface and the lever main body, to the detent surface and the lever main body.

According to another aspect of the invention, a method for manufacturing a lever operation device comprises:
- preparing a bracket portion comprising an insertion opening for insertion of a lever main body, a through-hole in communication with the insertion opening, and a magnet;
- inserting a detent portion, which is to be in contact with a detent surface of a detent wall arranged on a housing and generates a detent, into the through-hole so that a detent base end portion of the detent portion is exposed in the insertion opening;
- attaching the bracket portion to the housing; and
- inserting the lever main body into the insertion opening of the bracket portion, pushing the detent base end portion, which is exposed from the through-hole, into the through-hole so that a detent tip end portion of the detent portion is pressed against the detent surface, and integrating the lever main body with the bracket portion by coupling a first lock portion of the lever main body to a second lock portion of the bracket portion.

Advantageous Effects of Invention

According to the invention, a lever operation device with improved ease of assembly can be provided as well as a method for manufacturing the lever operation device.

BRIEF DESCRIPTION OF DRAWINGS

FIGS. 7A to 7E are diagrams illustrating an example of a method for manufacturing the lever operation device in the embodiment.

DESCRIPTION OF EMBODIMENTS

Short Summary of the Embodiment

A lever operation device in the embodiment is generally provided with a lever main body on which a first rotation operation about a first shaft is performed, a bracket portion that has an insertion opening for insertion of the lever main body and a through-hole in communication with the insertion opening, a housing which rotatably holds the bracket portion and on which a detent wall having a detent surface is arranged, and a detent portion that is inserted into the through-hole and has a detent tip end portion in contact with the detent surface, a detent base end portion in contact with the lever main body inserted into the insertion opening of the bracket portion, and an elastic portion applying an elastic force, which is generated by being sandwiched and compressed by the detent surface and the lever main body, to the detent surface and the lever main body.

A method for manufacturing a lever operation device in the embodiment includes preparing a bracket portion comprising an insertion opening for insertion of a lever main body, a through-hole in communication with the insertion opening, and a magnet, inserting a detent portion, which is to be in contact with a detent surface of a detent wall arranged on a housing and generates a detent, into the through-hole so that a detent base end portion of the detent portion is exposed in the insertion opening, attaching the bracket portion to the housing, and inserting the lever main body into the insertion opening of the bracket portion, pushing the detent base end portion, which is exposed from the through-hole, into the through-hole so that a detent tip end portion of the detent portion is pressed against the detent surface, and integrating the lever main body with the bracket portion by coupling a first lock portion of the lever main body to a second lock portion of the bracket portion.

This lever operation device and the manufacturing method thereof allows for improvement in ease of assembly since the detent tip end portion does not need to be pushed into the through-hole when arranging on the housing.

Embodiment (General Configuration of a Lever Operation Device 1)

Figure 1A:
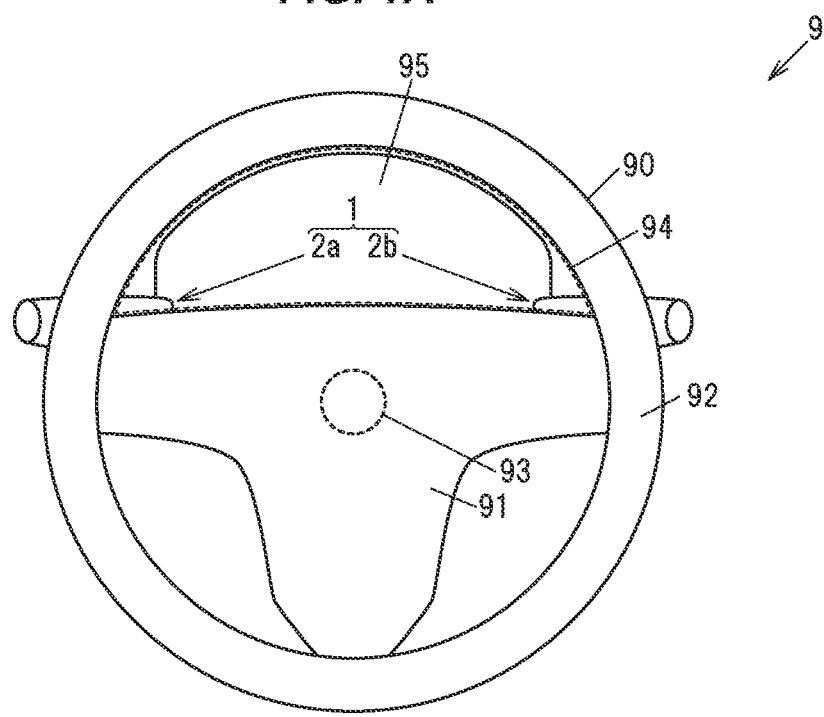
FIG. 1A is a diagram illustrating a periphery of a steering wheel of a vehicle in which an example of a lever operation device in an embodiment is mounted.
Figure 1B:
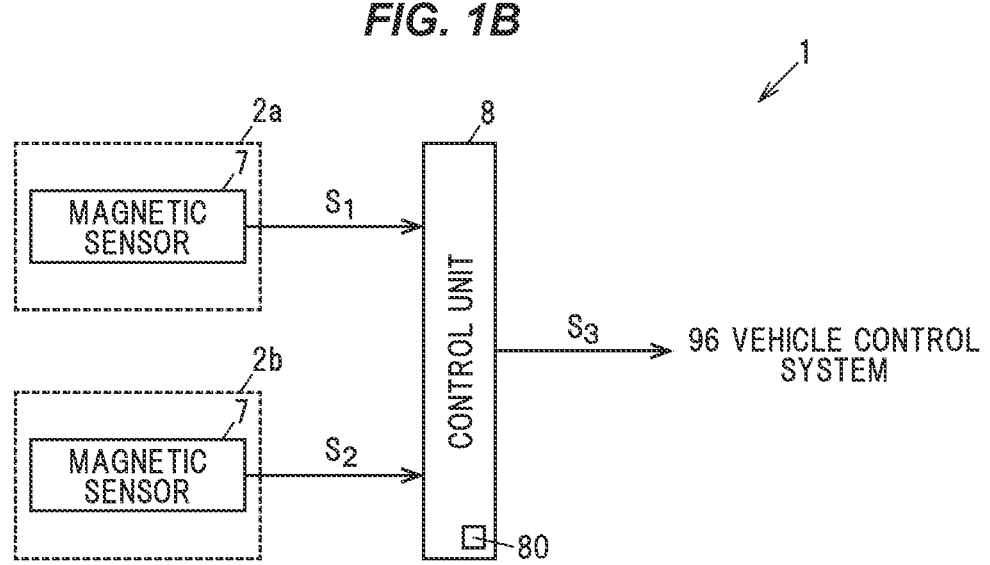
FIG. 1B is an exemplary block diagram illustrating the lever operation device.

FIG. 1A is a diagram illustrating an example of a lever operation device arranged in a vehicle, and FIG. 1B is an exemplary block diagram illustrating the lever operation device. In each drawing of the embodiment described below, a scale ratio may be different from an actual ratio. In addition, in FIG. 1B, flows of main signals and information are indicated by arrows. In the following general configuration of the lever operation device 1 and the manufacturing method thereof, the reference signs contained in the drawings (described later) are added in parentheses.

The lever operation device 1 is generally provided with a lever main body (30) on which a first rotation operation about a first shaft (410) is performed, a bracket portion (4) that has an insertion opening (411) for insertion of the lever main body (30) and a through-hole (412a) in communication with the insertion opening (411), a housing (10) which rotatably holds the bracket portion (4) and on which a detent wall (15) having a detent surface (150) is arranged, and a detent portion (5) that is inserted into the through-hole (412a) and has a detent tip end portion (50) in contact with the detent surface (150), a detent base end portion (52) in contact with the lever main body (30) inserted into the insertion opening (411) of the bracket portion (4), and an elastic portion (51) applying an elastic force, which is generated by being sandwiched and compressed by the detent surface (150) and the lever main body (30), to the detent surface (150) and the lever main body (30).

The lever operation device 1 further includes a magnet (6) attached at a tip end of the bracket portion (4), and a magnetic sensor (7) arranged in the housing (10) so as to face the magnet (6) and detects movement of the magnet (6) due to the first rotation operation performed on the lever main body (30).

The bracket portion (4) has a first bracket (41), which has the insertion opening (411), the through-hole (412a) and the first shaft (410) and to which the magnet (6) is attached, and a second bracket (42) which has a second shaft (420) intersecting the first shaft (410) and holds the first bracket (41). The housing (10) rotatably holds the second bracket (42). The lever main body (30) is operable by the first rotation operation about the first shaft (410) and a second rotation operation about the second shaft (420).

The through-hole (412a) is provided in a direction intersecting an insertion direction that the lever main body (30) is inserted. The lever main body (30) has a contact surface (303) that is located at a tip portion inserted into the insertion opening (411) of the first bracket (41) and comes into contact with the detent base end portion (52) of the detent portion (5) exposed from the through-hole (412a).

The lever main body (30) has a first lock portion. The bracket portion (4) has a second lock portion. In the lever operation device 1, the lever main body (30) and the bracket portion (4) are integrated by coupling the first lock portion to the second lock portion.

The lever operation device 1 includes lever operation units (2a and 2b) that are mounted on a vehicle (9), each comprise the lever main body (30), the bracket portion (4), the magnet (6) and the magnetic sensor (7), and are provided at left and right of the housing (10) so as to sandwich a steering shaft (93) of the vehicle (9) therebetween.

A method for manufacturing the lever operation device 1 includes preparing a bracket portion (4) having an insertion opening (411) for insertion of a lever main body (30), a through-hole (412a) in communication with the insertion opening (411), and a magnet (6), inserting a detent portion (5), which is to be in contact with a detent surface (150) of the detent wall (15) arranged on a housing (10) and generates a detent, into the through-hole (412a) so that a detent base end portion (52) of the detent portion (5) is exposed in the insertion opening (411), attaching the bracket portion (4) to the housing (10), and inserting the lever main body (30) into the insertion opening (411) of the bracket portion (4), pushing the detent base end portion (52), which is exposed from the through-hole (412a), into the through-hole (412a) so that a detent tip end portion (50) of the detent portion (5) is pressed against the detent surface (150), and integrating the lever main body (30) with the bracket portion (4) by coupling a first lock portion of the lever main body (30) to a second lock portion of the bracket portion (4).

The lever operation device 1 is mounted on a vehicle 9, as shown in FIG. 1A. The lever operation device 1 in the present embodiment includes a lever operation unit 2a and a lever operation unit 2b with a steering shaft 93 in-between, but it is not limited thereto. The number of lever operation units may be one or may be not less than three. Each of the lever operation unit 2a and the lever operation unit 2b is generally provided with a lever portion 3, a bracket portion 4, a detent portion 5, a magnet 6 and a magnetic sensor 7 which are described later.

The lever operation device 1 in the present embodiment is configured such that the lever operation unit 2a on the left side is a turn operation unit to operate directional indicators and headlamps, and the lever operation unit 2b on the right side is a shift operation unit to operate a shifting device, as an example. The shifting device is a device to switch the connection state of gears in a transmission of the vehicle 9 according to the operating position of the shift operation unit, such as park position, drive position, neutral position, as an example.

In the following description, left and right are left and right as viewed from a driver sitting in the driver's seat of the vehicle 9, up and down are up and down as viewed from the driver, and front and rear are front and rear of the vehicle 9, unless otherwise specified. In addition, the lever operation unit 2a and the lever operation unit 2b of the lever operation device 1 are assigned with at least one of functions of operating the directional indicators, the headlamps, the shifting device, a wiper device, etc. Next, a specific configuration of the lever operation device 1 is described below.

(Configuration of a Housing 10)

Figure 2A:
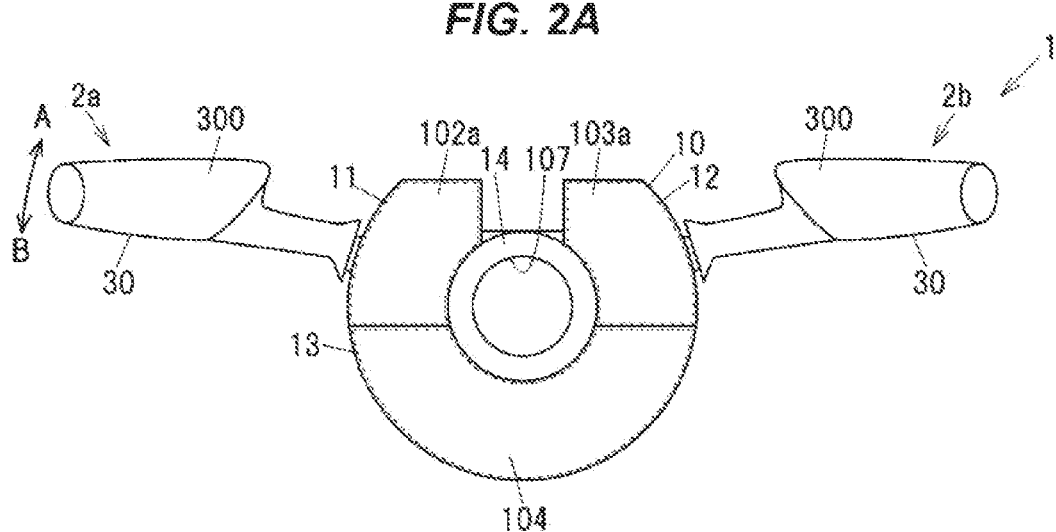
FIG. 2A is an exemplary front view of the lever operation device in the embodiment.
Figure 2B:
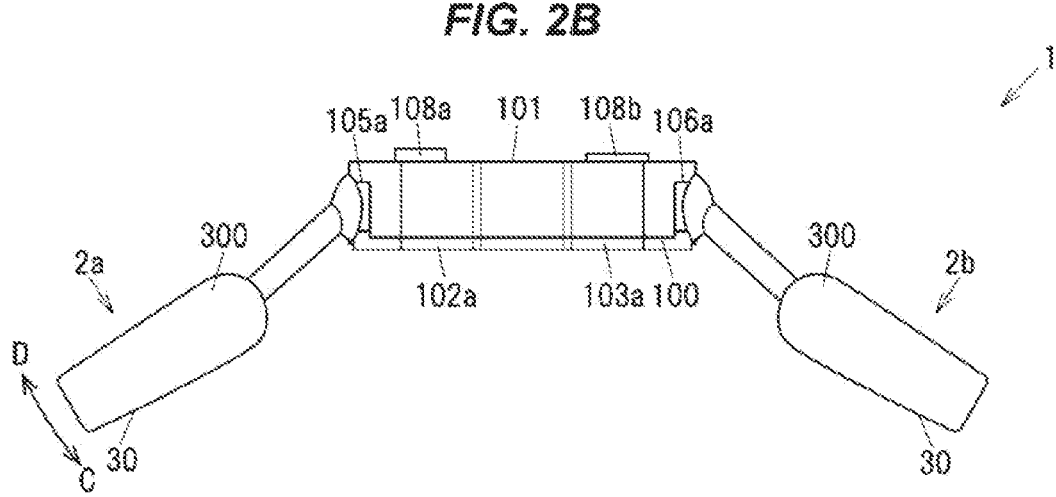
FIG. 2B is an exemplary top view thereof.
Figure 2C:
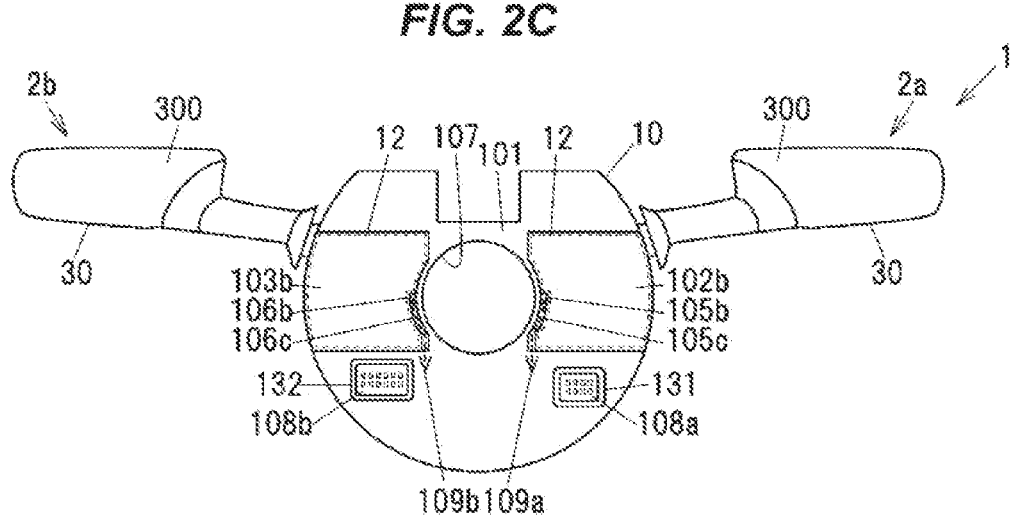
FIG. 2C is an exemplary back view thereof.
Figure 3A:
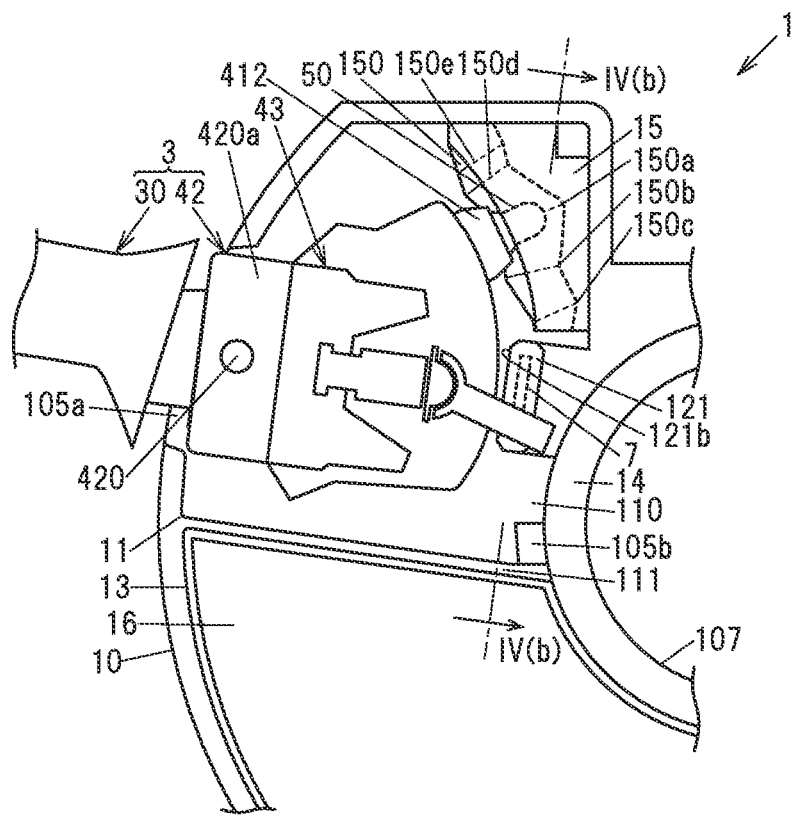
FIG. 3A is a diagram illustrating an example of when a front-left cover is removed from the lever operation device in the embodiment.
Figure 3B:
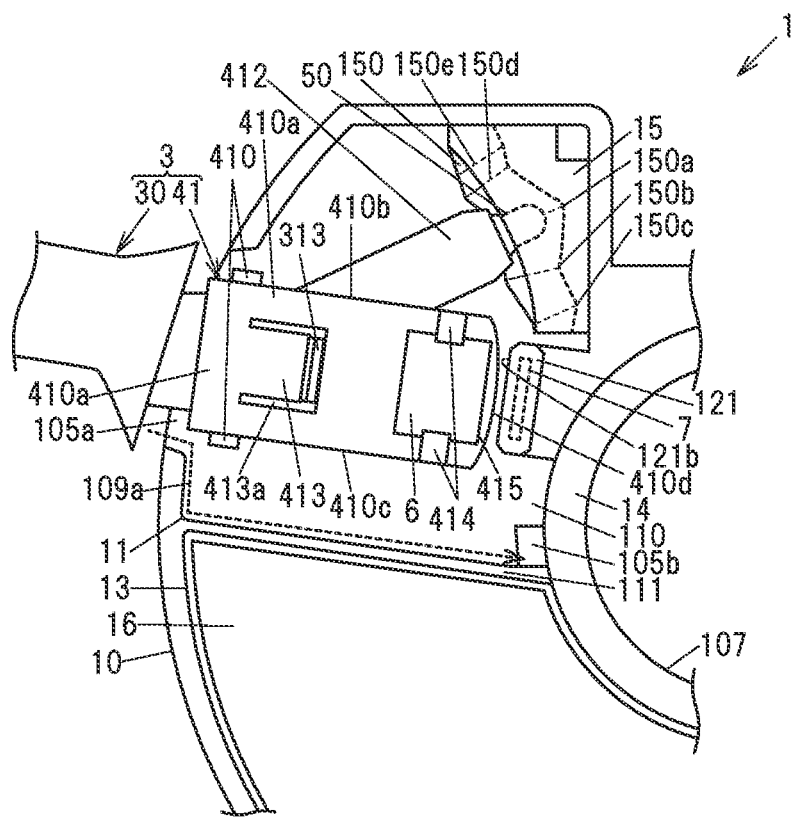
FIG. 3B is a diagram illustrating an example of when a second bracket is further removed.
Figure 4A:
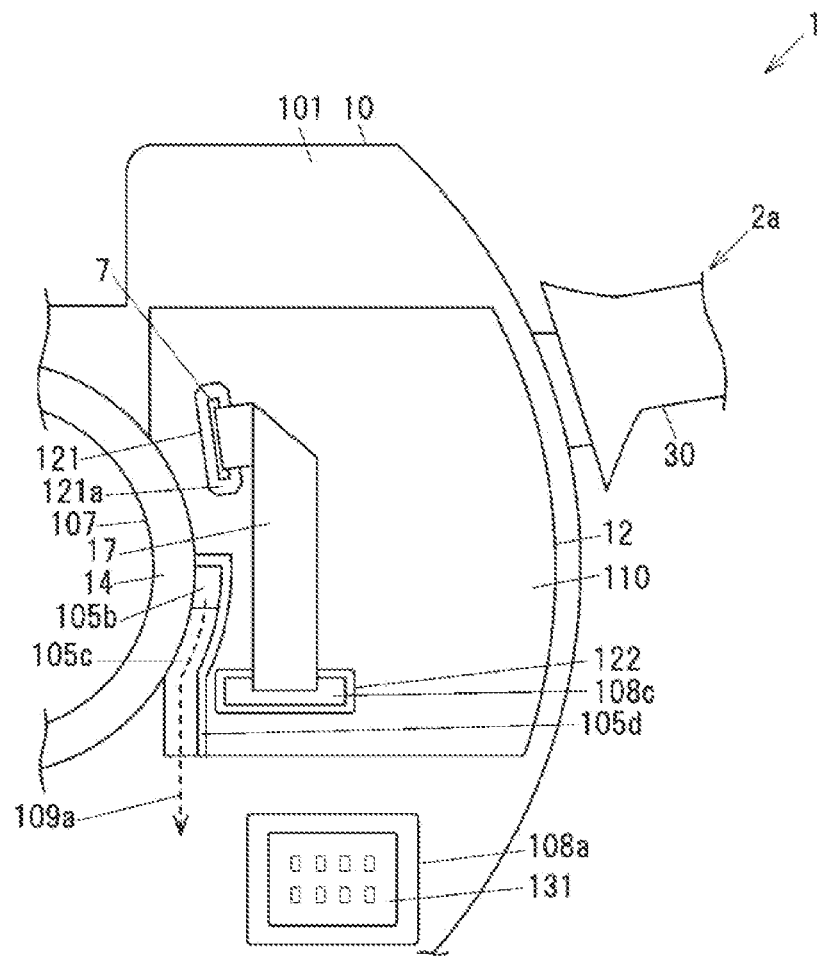
FIG. 4A is a diagram illustrating an example of when a back-left cover is removed from the lever operation device in the embodiment.
Figure 4B:
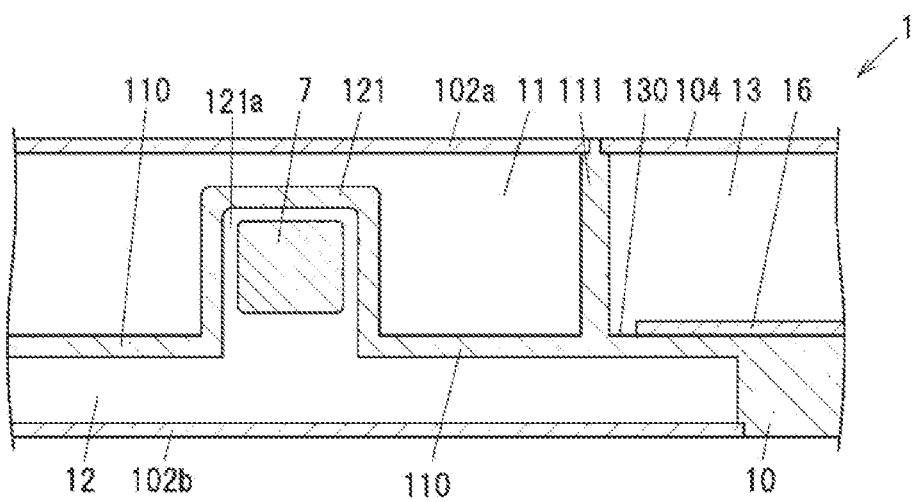
FIG. 4B is a schematic diagram illustrating an example of a cross section cut along line IV(b)-IV(b) of FIG. 3A.

FIG. 2A is an exemplary front view of the lever operation device, FIG. 2B is an exemplary top view thereof, and FIG. 2C is an exemplary back view thereof. FIG. 3A is a diagram illustrating an example of the lever operation device when a front-left cover is removed, and FIG. 3B is a diagram illustrating an example of the lever operation device when a second bracket is further removed. FIG. 4A is a diagram illustrating an example of the lever operation device when a back-left cover is removed, and FIG. 4B is a schematic diagram illustrating an example of a cross section cut along line IV(b)-IV(b) of FIG. 3A.

As an example, the housing 10 is formed of a resin material and has a circular cylindrical shape, as shown in FIGS. 2A to 2C. The housing 10 has an insertion hole 107 at the center. The insertion hole 107 is surrounded by a circular wall portion 14 and allows for insertion of the steering shaft 93.

As shown in FIG. 1A, the steering shaft 93 is inserted through the insertion hole 107 of the housing 10 of the lever operation device 1, and a base 91 of a steering wheel 90 is attached to the steering shaft 93 protruding from the insertion hole 107. The lever operation device 1 in the present embodiment is configured to not rotate with the steering wheel 90.

The housing 10 has a shape with the top cut off in the front view, as shown in FIG. 2A. Since the housing 10 has a shape with the top cut off, a visible area 94 between an upper portion of the base 91 and a ring portion 92 of the steering wheel 90 is wide as shown in FIG. 1A, hence, a meter panel 95 on which a speedometer, etc., is located is large and can provide better visibility. This visible area 94 is an area enclosed by a dotted line in FIG. 1A, and is an area surrounded by the upper portion of the base 91 and the ring portion 92 of the steering wheel 90.

A front-left cover 102a, a front-right cover 103a and a lower cover 104, which are formed of a resin material, are attached to the housing 10 on a front surface 100 side, i.e., on the driver's side, as shown in FIG. 2A. The front-left cover 102a and the front-right cover 103a have a shape formed by cutting off a top portion of an upper half of a circle having the insertion hole 107, then cutting off a portion of the center of the top portion, and further dividing into two parts. The lower cover 104 has a shape of a lower half of the circle.

When the housing 10 side is defined as a lower side, the front-left cover 102a covers an upper side of a left first room 11 in which the lever operation unit 2a is arranged. This first room 11 is a room surrounded by the housing 10 and the front-left cover 102a as indicated by a dotted line in FIG. 2A and is in communication with the outside of the housing 10 through an opening 105a provided to allow a lever main body 30 to protrude to the outside of the housing 10.

When the housing 10 side is defined as a lower side, the front-right cover 103a covers an upper side of a right first room 11 in which the lever operation unit 2b is arranged. This first room 11 is a room surrounded by the housing 10 and the front-right cover 103a as indicated by a dotted line in FIG. 2A and is in communication with the outside of the housing 10 through an opening 106a provided to allow a lever main body 30 to protrude to the outside of the housing 10.

When the housing 10 side is defined as a lower side, the lower cover 104 covers an upper side of a third room 13. The third room 13 is a room surrounded by the housing 10 and the lower cover 104 as indicated by a dotted line in FIG. 2A. A connector opening 131 and a connector opening 132 which penetrate a back surface 101 are provided on the housing 10 at a portion corresponding to the third room 13, as shown in FIG. 2C.

A connector portion 108a is arranged in the connector opening 131. A connector portion 108b is arranged in the connector opening 132. The connector portion 108a and the connector portion 108b are provided on a substrate 16 arranged on a bottom wall 130 of the third room 13 and are connected to connectors of a harness of the vehicle 9.

On the back surface 101 side, the housing 10 has second rooms 12 on the left and right sides of the insertion hole 107, as indicated by dotted lines in FIG. 2C. When the housing 10 side is defined as a lower side, a back-left cover 102b formed using a resin material is attached to cover an upper side of the left second room 12. When the housing 10 side is defined as a lower side, a back-right cover 103b formed using a resin material is attached to cover an upper side of the right second room 12.

As shown in FIGS. 2C and 4A, the left first room 11 in which the lever operation unit 2a is arranged has a drain hole 105b to drain a liquid or foreign matter entered through the opening 105a to the outside of the housing 10.

As shown in FIG. 4A, the drain hole 105b is in communication with a drain groove 105c formed on the back surface 101 side of the housing 10. The drain groove 105c is formed by the circular wall portion 14 forming the insertion hole 107 and a groove wall portion 105d provided along the drain groove 105c, and suppresses ingress of a liquid or foreign matter into the left second room 12.

Likewise, as shown in FIG. 2C, the right first room 11 in which the lever operation unit 2b is arranged has a drain hole 106b to drain a liquid or foreign matter entered through the opening 106a to the outside of the housing 10.

The drain hole 106b is in communication with a drain groove 106c formed on the back surface 101 side of the housing 10. The drain hole 106b is formed by the circular wall portion 14 and a groove wall portion 106d with a flipped shape of the left groove wall portion 150d and suppresses ingress of a liquid or foreign matter into the right second room 12, in the same manner as the drain hole 105b. In FIG. 4A, the groove wall portion 106d with the flipped shape of the groove wall portion 150d is not shown as it is disposed flipped on the left side.

The left second room 12 is a room surrounded by the housing 10 and the back-left cover 102b and is separated from the drain groove 105c by the groove wall portion 150d. Likewise, the right second room 12 is a room surrounded by the housing 10 and the back-right cover 103b and is separated from the drain groove 106c by the groove wall portion 106d.

In case of the left lever operation unit 2a, a liquid or foreign matter enters the first room 11 through the opening 105a, gets into the drain hole 105b after trickling down by gravity along a wall 111 separating the first room 11 from the third room 13, and is drained through a drain route 109a along the drain groove 105c on the back surface 101 of the housing 10, as shown in FIGS. 2C and 3B.

In case of the right lever operation unit 2b, a liquid or foreign matter enters the first room 11 through the opening 106a, gets into the drain hole 106b after trickling down by gravity along the wall 111 separating the first room 11 from the third room 13, and is drained through a drain route 109b along the drain groove 106c on the back surface 101 of the housing 10, as shown in FIG. 2C.

The walls 111 forming the drain route 109a and the drain route 109b are inclined toward the drain hole 105b and the drain hole 106b to guide the liquid or foreign matter to the drain hole 105b and the drain hole 106b.

The drain route 109a and the drain route 109b are not paths through electronic circuits such as the magnetic sensors 7 and the control unit 8. Therefore, malfunction thereof due to ingress of the liquid or foreign matter can be suppressed in the lever operation device 1.

As shown in FIG. 4B, the third room 13 is separated from the first room 11 by the wall 111. However, the third room 13 is in communication with the second room 12 via a connector opening 122 provided in the second room 12, as shown in FIG. 4A.

A connector portion 108c is arranged in the connector opening 122. The connector portion 108c is connected to the magnetic sensor 7 via a cable 17. The connector portion 108c is provided on the substrate 16 on which the control unit 8 is arranged.

Thus, in the lever operation device 1, the magnetic sensor 7 arranged in the second room 12 and the control unit 8 arranged in the third room 13 are electrically connected via the cable 17. In this regard, the substrate 16 is, e.g., a printed circuit board. The cable 17 is, e.g., a flat cable.

Since the first room 11 and the second room 12 on the left side have the horizontally flipped shapes of the first room 11 and the second room 12 on the right side, the first room 11 and the second room 12 on the left side will be mainly described below.

(Configuration of the Lever Portion 3)

Figure 5A:
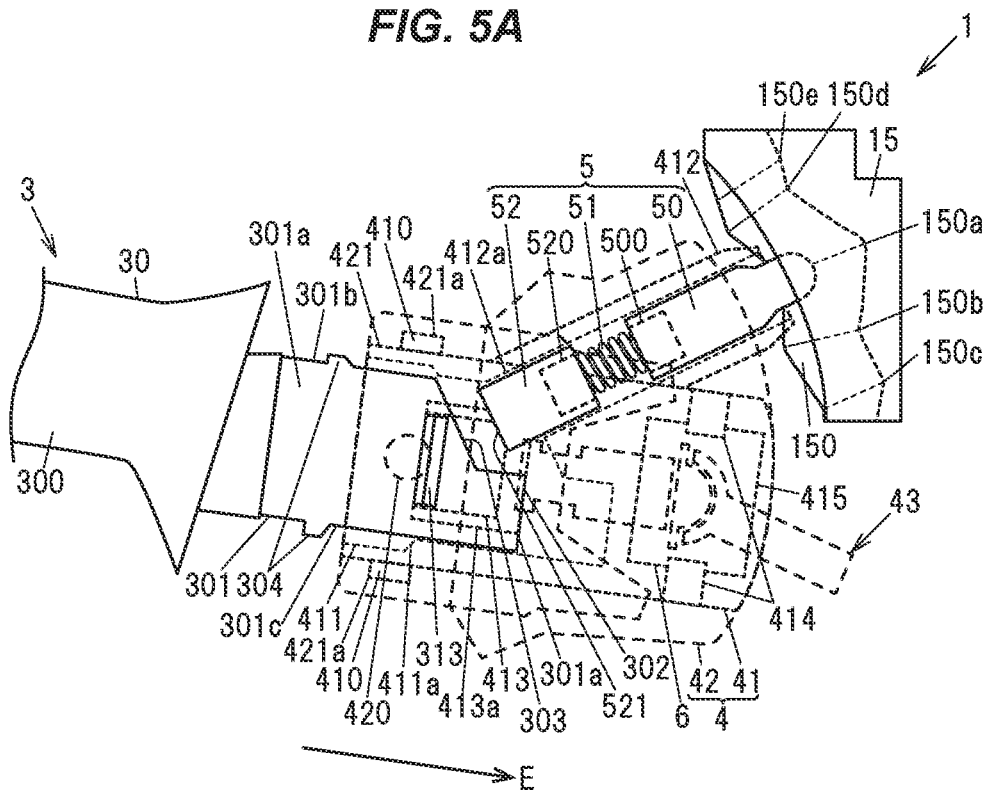
FIG. 5A is an exemplary diagram illustrating the lever operation device in the embodiment before a lever main body is inserted into a bracket portion.
Figure 5B:
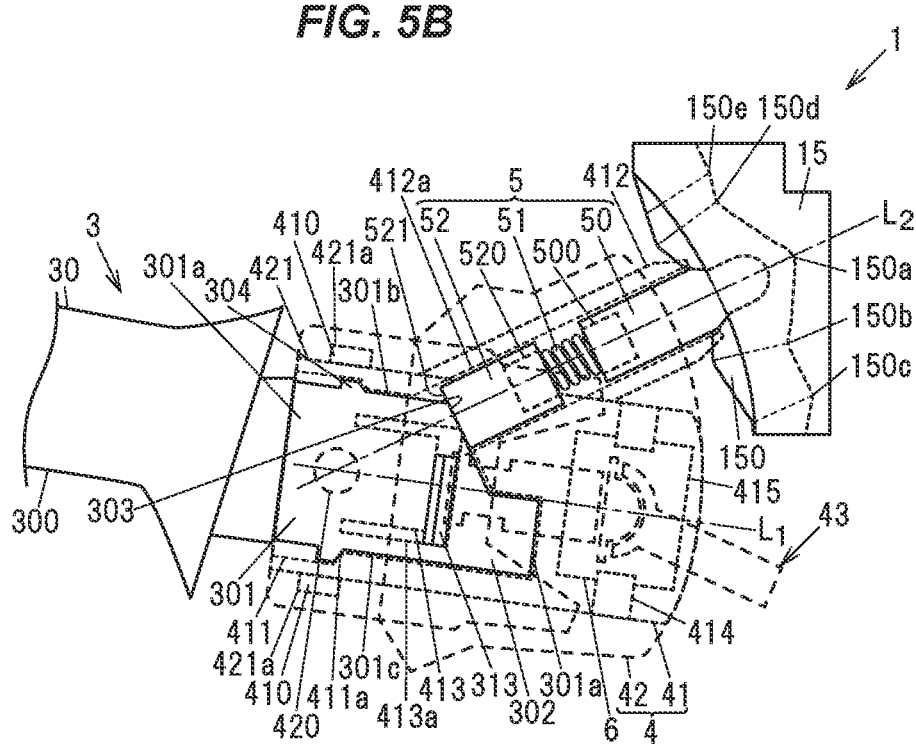
FIG. 5B is an exemplary diagram after the lever main body is inserted into the bracket portion.

FIG. 5A is an exemplary diagram before the lever main body is inserted into the bracket portion, and FIG. 5B is an exemplary diagram after the lever main body is inserted into the bracket portion.

As shown in FIGS. 5A and 5B, the lever portion 3 has the lever main body 30 and the bracket portion 4 attached to the lever main body 30. A specific configuration of the bracket portion 4 will be described later.

The lever main body 30 is formed of a resin material and has a gripping portion 300 which protrudes from the housing 10 and is gripped by a user, and an insertion portion 301 inserted into the bracket portion 4.

As shown in FIGS. 2A and 2B, the gripping portion 300 is operable in upward and downward directions (an arrow A direction and an arrow B direction) and in forward and rearward directions (an arrow C direction and an arrow D direction). An operation in the upward and downward directions is a second rotation operation about a second shaft 420. Meanwhile, an operation in the forward and rearward directions is a first rotation operation about a first shaft 410.

Operation directions of the first rotation operation and the second rotation operation are orthogonal. That is, the first shaft 410 serving as a rotational axis of the first rotation operation is orthogonal to the second shaft 420 serving as a rotational axis of the second rotation operation, but it is not limited thereto.

The lever operation unit 2a in the present embodiment can operate the functions of directional indicators, etc. Thus, an operation in the upward direction is an operation to turn on the directional indicators on the right side of the vehicle 9, an operation in the downward direction is an operation to turn on the directional indicators on the left side, an operation in the forward direction is an operation to change the headlamps to high beam, and an operation in the rearward direction is an operation to turn the headlamps on high beam during when the operation is performed.

That is, the directional indicators on the right side are turned on when the lever main body 30 of the lever operation unit 2a is operated in the upward direction by the user, the directional indicators on the left side are turned on when operated in the downward direction, headlights are switched from low beam to high beam when operated in the direction of pushing away, and headlights are switched from low beam to high beam only during the operation when operated toward the user.

As shown in FIGS. 5A and 5B, the insertion portion 301 has a substantially quadrangular prism shape. The insertion portion 301 has an end portion 302 at which an upper surface 301a has a smaller width than the gripping portion 300 side.

The end portion 302 has a contact surface 303 that is provided on a side surface 301b side, which is on the upper side of the paper of FIGS. 5A and 5B, and is inclined from the side surface 301b. Since the insertion portion 301 has the contact surface 303, a width from the side surface 301b to a side surface 301c on the gripping portion 300 side is larger than a width from the side surface 301b to the side surface 301c on the end portion 302 side.

The insertion portion 301 has claw portions 304 on the side surface 301b and the side surface 301c. When the lever main body 30 is inserted into a first bracket 41, the claw portions 304 come into contact with a stopper 411a provided in an insertion opening 411 of the first bracket 41.

As shown in FIGS. 5A and 5B, the insertion portion 301 has a protruding portion 313 as the first lock portion that protrudes from the upper surface 301a. The protruding portion 313 is fitted to a fitting portion 413 as the second lock portion of the first bracket 41 and thereby integrates the first bracket 41 with the insertion portion 301. In this regard, coupling of the first lock portion to the second lock portion is not limited to coupling of the protruding portion 313 to the fitting portion 413, and may be coupling of a raised portion to a recessed portion.

(Configuration of the Bracket Portion 4)

Figure 6A:
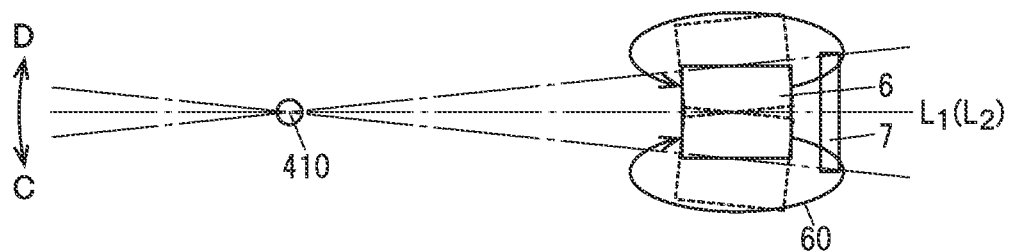
FIG. 6A is a diagram illustrating an example of rotation of a magnet about a first shaft in the lever operation device in the embodiment.
Figure 6B:
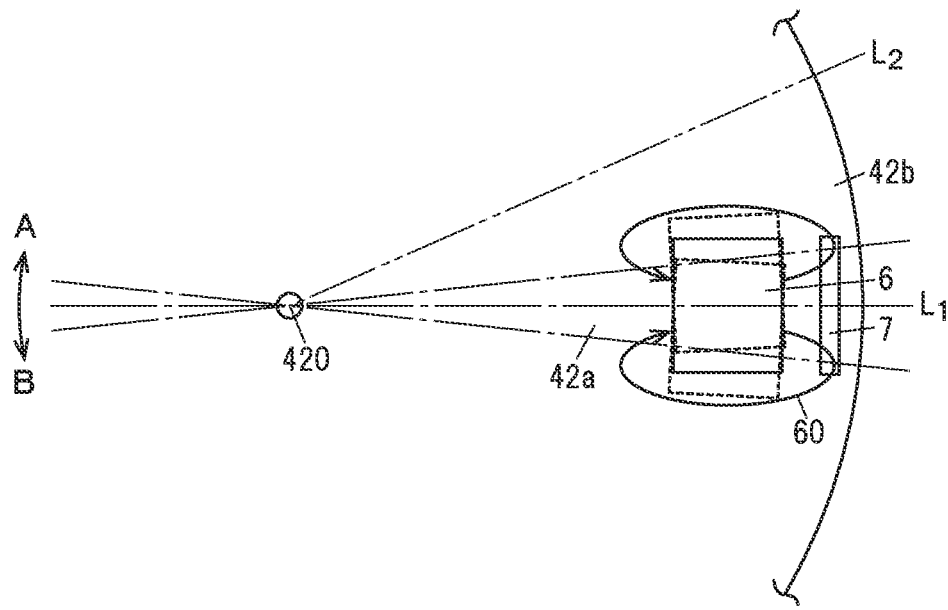
FIG. 6B is a diagram illustrating an example of rotation of the magnet about a second shaft.

FIG. 6A is a diagram illustrating an example of rotation of the magnet about the first shaft, and FIG. 6B is a diagram illustrating an example of rotation of the magnet about the second shaft.

The first bracket 41 is formed of a resin material and rotates together with the magnet 6 relative to the housing 10 by the first rotation operation about the first shaft 410, as shown in FIGS. 5B and 6A. The second bracket 42 is formed of a resin material and rotates together with the first bracket 41 and the magnet 6 relative to the housing 10 by the second rotation operation about the second shaft 420, as shown in FIGS. 5B and 6B.

As shown in FIGS. 5A and 5B, the first bracket 41 has the insertion opening 411 into which the lever main body 30 is inserted, a detent insertion portion 412 having a through-hole 412a in communication with the insertion opening 411, the fitting portion 413 to be coupled to the protruding portion 313 of the lever main body 30, and holding portions 414 to hold the magnet 6.

The first shaft 410 is provided on a side surface 410b and a side surface 410c. The first shaft 410 is inserted into recessed portions 421a formed in a housing opening 421 of the second bracket 42.

The insertion opening 411 is an opening into which the lever main body 30 is inserted, and it is wide at the entrance and narrow at the bottom.

The detent insertion portion 412 is provided on the side surface 410b on the upper side of the first bracket 41. The detent insertion portion 412 is out of alignment with an insertion direction of the lever main body 30 (an arrow E direction). In particular, the through-hole 412a is formed not in a direction of extension from the lever main body 30 inserted into the first bracket 41, i.e., not in a direction of extension from the insertion opening 411 of the bracket portion 4. The magnet 6 and the magnetic sensor 7 are arranged in this direction of extension, as shown in FIG. 3B.

The through-hole 412a is provided in a direction intersecting the insertion direction (the arrow E direction) in which the lever main body 30 is inserted. In particular, the through-hole 412a has a center line $L_2$ contained in an extended plane 42b extended from a plane 42a that a center line $L_1$ shown in FIG. 6B draws when rotated about the second shaft 420.

As shown in FIGS. 5A and 5B, the insertion opening 411 has a stopper 411b that prevents the inserted detent portion 5 from moving too far toward the insertion opening 411. The stopper 411b is provided to prevent the contact surface 303 from making contact.

As shown in FIG. 5B, the center line $L_1$ is the center line of the insertion portion 301 of the lever portion 3. That is, the center line $L_1$ coincides with the insertion direction of the lever main body 30. In FIG. 6A, the extended plane 42b is viewed from a side and thus overlaps the center line $L_1$. Therefore, in FIG. 6A, the center line $L_2$ of the through-hole 412a shown in FIG. 6B overlaps the center line $L_1$.

In addition, the center line $L_2$ of the through-hole 412a shown in FIG. 6B is a straight line passing the second shaft 420. Thus, the through-hole 412a is provided so that the center line $L_1$ when rotated about the second shaft 420 coincides with the center line $L_2$. However, the center line $L_2$ of the through-hole 412a is not limited to the straight line passing the second shaft 420 and may be a straight line intersecting the extended plane 42b.

As shown in FIG. 3B, the fitting portion 413 is provided on an upper surface 410a. The fitting portion 413 has grooves 413b on a front end face 413a and both side surfaces, and furthermore, it is bent toward the insertion opening 411. The groove 413b on the front end face 413a side has a shape to be fitted to the protruding portion 313 of the lever main body 30. The first bracket 41 and the lever main body 30 are integrated by fitting the protruding portion 313 to the groove 413b.

The holding portions 414 are provided as claws to hold the magnet 6 inserted into a recessed portion 415 which is open on the upper surface 410a side. As shown in FIG. 5B, the recessed portion 415 is located further ahead of a tip end of the insertion opening 411 into which the lever main body 30 is inserted.

To reduce a distance between the magnet 6 and the magnetic sensor 7, a tip end face 410d of the first bracket 41 is formed as a curved surface corresponding to rotation of the lever main body 30 about the second shaft 420 and faces a side portion 121b of a protruding portion 121 in which the magnetic sensor 7 is arranged.

The second bracket 42 has a cancelling mechanism 43 on an upper surface 420a. The cancelling mechanism 43 is a mechanism to return the lever main body 30 held up or down back to the pre-operation state, i.e., to return to the pre-operation state by an operation performed on the steering wheel 90. In this regard, the cancelling mechanism 43 is not arranged in the right lever operation unit 2b since it is a mechanism required when assigned to operate, e.g., directional indicators and is not essential.

As shown in FIGS. 5A and 5B, the second bracket 42 has the housing opening 421 into which the lever main body 30 is inserted and in which the first bracket 41 is housed. The housing opening 421 rotatably holds the first bracket 41.

The second bracket 42 is configured to be, e.g., divisible. To attach the second bracket 42 to the first bracket 41, the first bracket 41 is arranged on one of the divided pieces of the second bracket 42 and the other piece is then assembled.

To install the lever operation unit 2a, the detent portion 5 is set in the through-hole 412a after the second bracket 42 is attached to the first bracket 41, these are then arranged in the first room 11, and the front-left cover 102a is further attached to the housing 10, and in this state, the lever main body 30 is inserted. At this time, the detent portion 5 is maintained in the set position since the stopper 411b is provided in the through-hole 412a.

The second shaft 420 is provided on the upper surface 420a. The second shaft 420 is inserted into recessed portions formed on the wall 110 of the housing 10 in the first room 11 and on the front-left cover 102a.

(Configuration of the Detent Portion 5)

As shown in FIGS. 5A and 5B, the detent portion 5 is composed of a detent tip end portion 50, an elastic portion 51 and a detent base end portion 52.

In particular, the detent portion 5 is provided on the lever portion 3 and has the detent tip end portion 50 which generates a detent by moving with a tilt in a direction of the first rotation operation from a direction of extension from the end portion 302 of the lever portion 3 and coming into contact with a detent surface 150 of the detent wall 15 arranged on the housing 10, and the elastic portion 51 applying an elastic force to the detent tip end portion 50.

The detent portion 5 is inserted into the through-hole 412a, and the detent base end portion 52 on the opposite side to the detent tip end portion 50 is in contact with the contact surface 303 of the lever main body 30 inserted into the insertion opening 411 of the first bracket 41.

The detent tip end portion 50 has a columnar shape and has a smaller radius on the detent wall 15 side than on the elastic portion 51 side. In addition, a portion of the detent tip end portion 50 in contact with the detent wall 15 has a spherical shape. The detent tip end portion 50 has a recessed portion 500 into which the elastic portion 51 is inserted. The detent tip end portion 50 is formed using a resin material but may be formed of a metal material.

The elastic portion 51 is a coil spring formed of a metal material, as an example. The elastic portion 51 is provided between the detent tip end portion 50 and the detent base end portion 52. The elastic portion 51, when arranged in the through-hole 412a, is compressed from the natural length and thus applies an elastic force to the detent tip end portion 50 and the detent base end portion 52. Therefore, the detent tip end portion 50 is pressed against the detent surface 150 of the detent wall 15 by the elastic force of the elastic portion 51. The detent base end portion 52 is pressed against the lever main body 30 by the elastic force of the elastic portion 51.

The detent base end portion 52 has a columnar shape. The detent base end portion 52 has a recessed portion 520 into which the elastic portion 51 is inserted. The detent base end portion 52 is formed using a resin material but may be formed of a metal material.

Before inserting the lever main body 30, the detent portion 5 is inserted into the through-hole 412a so that the detent base end portion 52 is exposed in the insertion opening 411, as shown in FIG. 5A. At this time, the detent tip end portion 50 is located away from the detent surface 150 as shown in FIG. 5A so that the bracket portion 4 can be easily placed in the first room 11.

As a modification, after attaching the bracket portion 4 in the first room 11, the detent portion 5 may be inserted from the detent tip end portion 50 into the through-hole 412a through the opening 105a of the housing 10. This further facilitates automated assembly of the lever operation unit 2a and the lever operation unit 2b.

When the lever main body 30 is inserted into the insertion opening 411, the contact surface 303 of the lever main body 30 comes into contact with an end face 521 of the detent base end portion 52 as shown in FIG. 5B and the detent portion 5 moves toward the detent surface 150. When the lever main body 30 is pushed in to the position where the protruding portion 313 is fitted to the fitting portion 413 of the first bracket 41, the detent portion 5 is pushed by the lever main body 30, the elastic portion 51 is compressed and presses the detent tip end portion 50 against the detent surface 150, and assembly of the lever main body 30 is completed.

As a modification, the lever main body 30 may include a protruding portion which comes into contact with the detent base end portion 52, instead of having the contact surface 303. This protruding portion has a shape which protrudes toward the through-hole 412a when the lever main body 30 is assembled to the bracket portion 4.

The detent wall 15 is arranged in the first room 11. The detent wall 15 has the detent surface 150 in contact with the detent tip end portion 50 of the detent portion 5. As shown in FIGS. 5A and 5B, the detent surface 150 has a base recess 150a in which the detent tip end portion 50 is located before operation, and a first peak portion 150b, a first valley portion 150c, a second peak portion 150d and a second valley portion 150e which generate a detent when the lever main body 30 is operated in the upward and downward directions.

As shown in FIGS. 5A and 5B, the base recess 150a is a V-shaped groove. The base recess 150a is a groove with both ends slanted toward the bracket portion 4 so that the elastic portion 51 is compressed during operation in the arrow C direction and the arrow D direction. The base recess 150a may have a recessed portion at an end of the groove to retain the position of the lever main body 30 operated in the arrow D direction.

The first peak portion 150b has a raised V-shape. The first valley portion 150c is a V-shaped groove. The first valley portion 150c may have a recessed portion at an end of the groove to retain the position of the lever main body 30 operated in the arrow D direction.

When the lever main body 30 is operated in the arrow A direction, the detent tip end portion 50 moves from the base recess 150a, passes over the first peak portion 150b, and fits into the first valley portion 150c. The detent tip end portion 50 generates a detent by passing over the first peak portion 150b and fitting into the first valley portion 150c.

The second peak portion 150d has a raised V-shape. The second valley portion 150e is a V-shaped groove. The second valley portion 150e may have a recessed portion at an end of the groove to retain the position of the lever main body 30 operated in the arrow D direction.

When the lever main body 30 is operated in the arrow B direction, the detent tip end portion 50 moves from the base recess 150a, passes over the second peak portion 150d, and fits into the second valley portion 150e. The detent tip end portion 50 generates a detent by passing over the second peak portion 150d and fitting into the second valley portion 150e.

Modification of the Detent Portion 5

The detent portion 5 may be composed of the detent tip end portion 50 and the elastic portion 51. In this modification, the elastic portion 51 of the detent portion 5 comes into contact with the contact surface 303 of the lever main body 30.

In addition, the elastic portion 51 is a coil spring but it is not limited thereto. The elastic portion 51 may be an elastic member such as synthetic rubber or silicon rubber. In addition, the detent tip end portion 50, the elastic portion 51 and the detent base end portion 52 of the detent portion 5 may be integrally formed by co-molding.

(Configuration of the Magnet 6)

The magnet 6 is, e.g., a permanent magnet such as ferrite magnet or neodymium magnet. The magnet 6 has a rectangular shape. As an example, the magnet 6 is magnetized to have an N pole on the magnetic sensor 7 side and an S pole on the opposite side, as shown in FIGS. 6A and 6B. The magnetization direction of the magnet 6 is not limited as long as the magnetic sensor 7 can detect a magnetic field 60 which changes by rotation operations performed on the lever main body 30.

The magnet 6 is arranged to face the magnetic sensor 7 but does not come into contact with the detent portion 5 since the detent portion 5 is positioned out of alignment with the magnetic sensor 7. Thus, the magnet 6 can be arranged to face the magnetic sensor 7 and also can be arranged inside the first bracket 41 instead of on a surface of the first bracket 41, which allows its volume to be increased to generate a strong magnetic field 60, hence, detection accuracy of the magnetic sensor 7 can be improved. In addition, since a large magnet can be used as the magnet 6, it is possible to use an inexpensive magnet such as ferrite magnet.

(Configuration of the Magnetic Sensor 7)

The magnetic sensor 7 is a sensor to detect changes in the magnetic field 60 with movement of the magnet 6 caused by the first rotation operation and the second rotation operation performed on the lever portion 3. The magnetic sensor 7 is formed using a magnetoresistive sensor or a Hall sensor. The magnetic sensor 7 in the present embodiment is a Hall IC (=Integrated Circuit) from which analog signals generated by detection of the movement of the magnet 6 are output as digital signals, as an example. The magnetic sensor 7 may be a sensor only.

The magnetic sensor 7 detects up, down, left and right movement of the magnet 6, as shown in FIGS. 6A and 6B. The magnetic sensors 7 of the lever operation unit 2a and the lever operation unit 2b are connected to the control unit 8 and outputs a detection signal S and a detection signal $S_2$, which are digital signals, based on the detection of the movement of the magnet 6, as shown in FIG. 1B.

As shown in FIG. 4B, the magnetic sensor 7 is arranged in the second room 12 which is separated from the first room 11 by the wall 110. Separating the first room 11 from the second room 12 means that they do not share any space.

The housing 10 has the protruding portion 121 that protrudes from the wall 110 of the first room 11. The protruding portion 121 has an internal space 121a in which the magnetic sensor 7 is arranged. The internal space 121a constitutes part of the second room 12. The magnetic sensor 7 faces the magnet 6 via the side portion 121b of the protruding portion 121.

In the lever operation device 1, the detent portion 5 and the magnet 6/the magnetic sensor 7 are arranged vertically as viewed from the user. Since the lever operation device 1 can have the magnet 6 inside the first bracket 41 without contact with the detent portion 5, the magnet 6 which is inexpensive and capable of generating the necessary and sufficient magnetic field 60 can be used while suppressing the thickness of the first bracket 41, as compared to when a magnet is arranged on a surface of the first bracket 41.

(Configuration of the Control Unit 8)

The control unit 8 is, e.g., a microcomputer composed of a CPU (=Central Processing Unit) performing calculation and processing, etc., of the acquired data according to a stored program, and a RAM (=Random Access Memory) and a ROM (=Read Only Memory) as semiconductor memories, etc. The ROM stores, e.g., a program for operation of the control unit 8. The RAM is used as, e.g., a storage area to temporarily store calculation results, etc. The control unit 8 also has, inside thereof, a means to generate a clock signal and operates based on the clock signal.

The control unit 8 is arranged on the substrate 16 and has a threshold value 80 used to determine an operation direction. The control unit 8 determines the operation based on the detection signals $S_1$, $S_2$ output from the magnetic sensors 7 of the lever operation units 2a, 2b and the threshold value 80, generates operation information S3 and outputs it to a vehicle control system 96. The vehicle control system 96 performs overall control of the vehicle 9 and controls the directional indicators and the shifting device, etc., based on the acquired operation information S3.

Next, a method for manufacturing the lever operation device 1 in the present embodiment will be described.

(Method for Manufacturing the Lever Operation Device 1)

The method for manufacturing the lever operation device 1 includes preparing the bracket portion 4 having the insertion opening 411 for insertion of the lever main body 30, the through-hole 412a in communication with the insertion opening 411, and the magnet 6, inserting the detent portion 5, which is to be in contact with the detent surface 150 of the detent wall 15 arranged on the housing 10 and generates a detent, into the through-hole 412a so that the detent base end portion 52 of the detent portion 5 is exposed in the insertion opening 411, attaching the bracket portion 4 to the housing 10, inserting the lever main body 30 into the insertion opening 411 of the bracket portion 4, pushing the detent base end portion 52, which is exposed from the through-hole 412a, into the through-hole 412a so that the detent tip end portion 50 of the detent portion 5 is pressed against the detent surface 150, and integrating the lever main body 30 with the bracket portion 4 by coupling the protruding portion 313 of the lever main body 30 to the fitting portion 413 of the bracket portion 4. Next, how the left lever operation unit 2a is assembled will be described in reference to FIGS. 7A to 7E.

Firstly, the bracket portion 4 having the insertion opening 411 for insertion of the lever main body 30, the through-hole 412a in communication with the insertion opening 411, and the magnet 6 is prepared. FIG. 7A shows an example of the bracket portion 4 after assembling the first bracket 41 to the second bracket 42.

In the next assembly step, the detent portion 5, which is to be in contact with the detent surface 150 of the detent wall 15 arranged on the housing 10 and generates a detent, is inserted into the through-hole 412a so that the detent base end portion 52 of the detent portion 5 is exposed in the insertion opening 411. FIG. 7B shows an example of after the detent portion 5 is inserted into the through-hole 412a of the bracket portion 4. By this insertion, the detent base end portion 52 of the detent portion 5 is inserted into the through-hole 412a so as to be exposed in the insertion opening 411 as shown in FIG. 5A.

In the next assembly step, the bracket portion 4 is attached to the housing 10. FIG. 7C shows an example of after the bracket portion 4 with the detent portion 5 inserted thereinto is arranged in the first room 11 and the front-left cover 102a is attached from above. The main parts hidden by the front-left cover 102a are indicated by dotted lines in FIG. 7A.

As a modification, if the stopper 411b is not provided and the detent portion 5 can be inserted into the through-hole 412a from the opening 105a side, the assembly may be carried out in such a manner that, after arranging the bracket portion 4 in the first room 11 and attaching the front-left cover 102a, the detent portion 5 is inserted into the through-hole 412a through the opening 105a and the lever main body 30 is then inserted.

In the next assembly step, the lever main body 30 is inserted into the insertion opening 411 of the bracket portion 4. FIG. 7D shows an example of insertion of the insertion portion 301 of the lever main body 30 into the insertion opening 411.

In the next assembly step, the detent base end portion 52, which is exposed from the through-hole 412a, is pushed into the through-hole 412a so that the detent tip end portion 50 of the detent portion 5 is pressed against the detent surface 150, and the lever main body 30 is integrated with the bracket portion 4 by coupling the protruding portion 313 of the lever main body 30 to the fitting portion 413 of the bracket portion 4. FIG. 7E shows an example of after the lever main body 30 is inserted into the insertion opening 411 and integrated with the bracket portion 4.

By this insertion, the contact surface 303 of the lever main body 30 comes into contact with the end face 521 of the detent base end portion 52 and the detent portion 5 moves toward the detent surface 150 as shown in FIG. 5B. When the lever main body 30 is further pushed in to the position where the protruding portion 313 of the lever main body 30 is fitted to the fitting portion 413 of the first bracket 41, the elastic portion 51 is compressed and presses the detent tip end portion 50 against the detent surface 150, and assembly of the lever main body 30 to the bracket portion 4 is completed.

Effects of the Embodiment

The lever operation device 1 in the present embodiment allows for improvement in ease of assembly. In particular, since the detent tip end portion 50 does not need to be pushed into the through-hole 412a when arranging on the housing 10, ease of assembly of the lever operation device 1 can be improved.

In more particular, when the detent portion is assembled to the housing while pushing it into the through-hole, the assembling direction is not straight and becomes a twisting trajectory to avoid contact with the detent wall, and automated assembly by machine is thus difficult to achieve. However, when assembling the lever operation device 1, the detent portion 5 does not need to be compressed when attached to the bracket portion 4. Therefore, the assembling direction is straight, e.g., it is possible to assemble only by placing a component on a work piece, which reduces the size of the work piece and facilitates automated assembly by machine.

The lever operation device 1 is thin and also allows the same main mechanisms to be used for the turn operation unit and the shift operation unit which are provided as the lever operation units. Therefore, the lever operation device 1 can be easily compatible with various specifications of the vehicle 9 and the cost is suppressed.

Although some embodiment and modifications of the invention have been described, these embodiment and modifications are merely an example and the invention according to claims is not to be limited thereto. These new embodiment and modifications thereof may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications thereof are included within the scope and gist of the invention and also within the invention described in the claims and the range of equivalency.

REFERENCE SIGNS LIST

1 LEVER OPERATION DEVICE
2a, 2b LEVER OPERATION UNIT
3 LEVER PORTION
4 BRACKET PORTION
5 DETENT PORTION
6 MAGNET
7 MAGNETIC SENSOR
9 VEHICLE
10 HOUSING
15 DETENT WALL
30 LEVER MAIN BODY
41 FIRST BRACKET
42 SECOND BRACKET
50 DETENT TIP END PORTION
51 ELASTIC PORTION
52 DETENT BASE END PORTION
93 STEERING SHAFT
150 DETENT SURFACE
303 CONTACT SURFACE
410 FIRST SHAFT
411 INSERTION OPENING
412a THROUGH-HOLE
413 FITTING PORTION
420 SECOND SHAFT

The invention claimed is:

1. A lever operation device, comprising:
a lever main body on which a first rotation operation about a first shaft is performed;
a bracket portion that comprises an insertion opening for insertion of the lever main body and a through-hole in communication with the insertion opening;
a housing which rotatably holds the bracket portion and on which a detent wall comprising a detent surface is arranged; and
a detent portion that is inserted into the through-hole and comprises a detent tip end portion in contact with the detent surface, a detent base end portion in contact with the lever main body inserted into the insertion opening of the bracket portion, and an elastic portion applying an elastic force, which is generated by being sandwiched and compressed by the detent surface and the lever main body, to the detent surface and the lever main body.

2. The lever operation device according to claim 1, further comprising:
a magnet attached at a tip end of the bracket portion; and
a magnetic sensor arranged in the housing so as to face the magnet and detects movement of the magnet due to the first rotation operation performed on the lever main body.

3. The lever operation device according to claim 2, wherein the bracket portion comprises a first bracket, which comprises the insertion opening, the through-hole and the first shaft and to which the magnet is attached, and a second bracket which comprises a second shaft intersecting the first shaft and holds the first bracket, wherein the housing rotatably holds the second bracket, and wherein the lever main body is operable by the first rotation operation about the first shaft and a second rotation operation about the second shaft.

4. The lever operation device according to claim 3, wherein the through-hole is provided in a direction intersecting an insertion direction that the lever main body is inserted, and wherein the lever main body comprises a contact surface that is located at a tip portion inserted into the insertion opening of the first bracket and comes into contact with the detent base end portion of the detent portion exposed from the through-hole.

5. The lever operation device according to claim 2, wherein the lever main body comprises a first lock portion, wherein the bracket portion comprises a second lock portion, and wherein the lever main body and the bracket portion are integrated by coupling the first lock portion to the second lock portion.

6. The lever operation device according to claim 2, further comprising lever operation units that are mounted on a vehicle, each comprise the lever main body, the bracket portion, the magnet and the magnetic sensor, and are provided at left and right of the housing so as to sandwich a steering shaft of the vehicle therebetween.

7. The lever operation device according to claim 2, wherein the housing further comprises a first room in which the magnet is housed and a second room in which the magnet sensor is housed, and
wherein the first room is separated from the second room by a wall.

8. The lever operation device according to claim 7, wherein the detent wall is disposed in the first room.

9. The lever operation device according to claim 2, wherein the bracket portion further comprises an insertion opening for insertion of the lever main body, and
wherein the detent portion is not disposed in a direction of extension from the insertion opening.

10. The lever operation device according to claim 2, wherein the device is mounted on a vehicle, and the detent potion is, viewing from a driver of the vehicle, disposed vertically with respect to the magnet and the magnetic sensor.

11. The lever operation device according to claim 1, wherein a tip end of the first bracket comprises a recessed portion in which the magnet is housed, and
wherein the detent portion is not disposed in the recessed portion.

12. A method for manufacturing a lever operation device, comprising:
preparing a bracket portion comprising an insertion opening for insertion of a lever main body, a through-hole in communication with the insertion opening, and a magnet;
inserting a detent portion, which is to be in contact with a detent surface of a detent wall arranged on a housing and generates a detent, into the through-hole so that a detent base end portion of the detent portion is exposed in the insertion opening;
attaching the bracket portion to the housing; and
inserting the lever main body into the insertion opening of the bracket portion, pushing the detent base end portion, which is exposed from the through-hole, into the through-hole so that a detent tip end portion of the detent portion is pressed against the detent surface, and integrating the lever main body with the bracket portion by coupling a first lock portion of the lever main body to a second lock portion of the bracket portion.

* * * * *